Nov. 5, 1963
W. P. COUSINO ETAL
3,109,317
COUNTERSHAFT GEARING NOISE ELIMINATOR
Filed Dec. 1, 1961
2 Sheets-Sheet 1
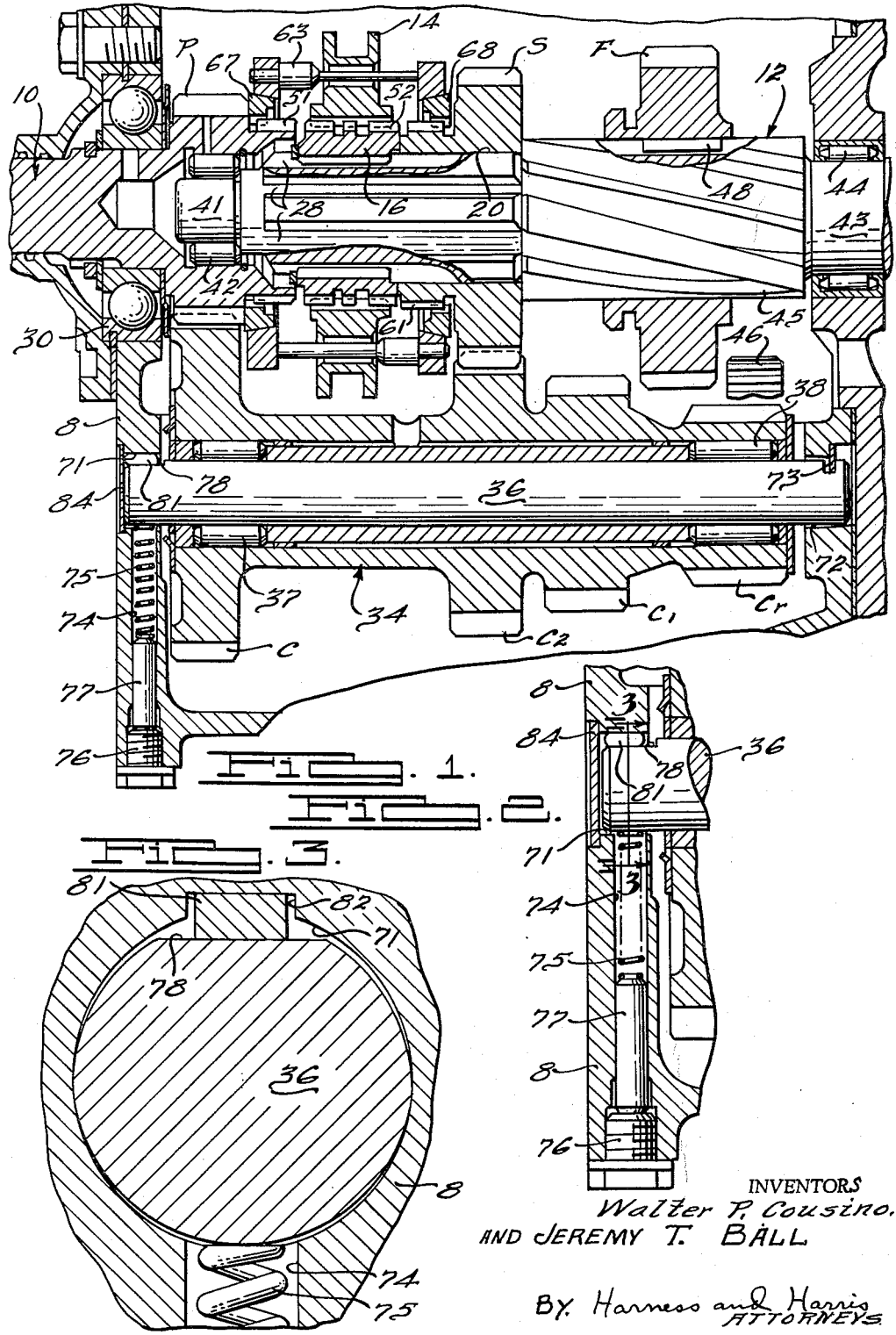
INVENTORS
Walter P. Cousino.
AND JEREMY T. BALL
BY Harness and Harris
ATTORNEYS Nov. 5, 1963 W. P. COUSINO ETAL 3,109,317
COUNTERSHAFT GEARING NOISE ELIMINATOR
Filed Dec. 1, 1961 2 Sheets-Sheet 2

INVENTORS
Walter P. Cousino.
AND JEREMY T. BALL.
By Harness and Harris
ATTORNEYS.

United States Patent Office 3,109,317
Patented Nov. 5, 1963

3,109,317
COUNTERSHAFT GEARING NOISE ELIMINATOR
Walter P. Cousino, St. Clair Shores, and Jeremy T. Bail, Birmingham, Mich., assignors to Chrysler Corporation, Highland Park, Mich., a corporation of Delaware
Filed Dec. 1, 1961, Ser. No. 156,255
18 Claims. (Cl. 74—411)

This invention relates to a means for eliminating gear rattle in countershaft gearing assemblies and particularly gearing asemblies such as those used in manually shifted, sliding gear, multiple speed, motor vehicle drive train transmissions.

It is a primary object of this invention to provide a gear rattle eliminator that can be readily and economically incorporated in the current type of manually shifted, sliding gear, motor vehicle drive train transmission without introducing complexities or problems as regards the manufacture and/or operation of the transmission or its components.

It is still another object of this invention to provide a transmission with a resilinetly supported countershaft gear cluster arranged to hold the constantly meshed, unloaded, gear teeth in sufficiently close contact so as to prevent gear rattle noise therebetween while permitting limited gear tooth separation during the transmission of drive through the gear cluster to provide an efficient, wear resistant, quiet drive train.

It is a further object of this invention to support transmission gearing and associated countershaft gearing on one or more floating gear shafts that have means associated therewith to limit the axial separation of the shafts while resilient means urge said shafts and the associated gearing towards one another to prevent gear rattle of the unloaded, meshed, gear teeth.

It is still another object of this invention to provide a resiliently supported gear shaft in a countershaft gearing arrangement wherein means are included for adjusting and limiting the relative lateral movement between the spaced gear shafts.

Other objects and advantages of this invention will be readily apparent from a reading of the following description and a consideration of the related drawings wherein:

FIG. 1 is a sectional elevational view of a countershaft type, sliding gear, manually shifted, multi-speed transmission adapted for motor vehicle drive trains which transmission embodies this invention, the transmission being shown in neutral condition;

FIG. 2 is an enlarged, fragmentary sectional elevational view of the left end portion of the casing support for the gearing countershaft;

FIG. 3 is an enlarged, fragmentary sectional elevational view taken along the line of and in the direction of the arrows 3—3 of FIG. 2 and showing the position of the countershaft when there is no torque load being transmitted by the countershaft gearing;

Figure 4:
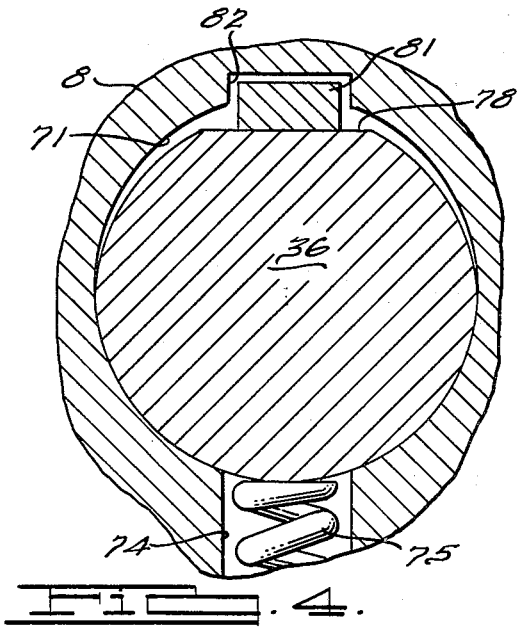
FIG. 4 is a fragmentary sectional elevational view similar to FIG. 3 but showing the arrangement when the countershaft gearing is carrying a torque load.

Manual transmission gear rattle results from variation in the angular speed of input shaft 10 causing the constantly meshed teeth of the drive pinion P and countershaft cluster gear C and the meshed teeth of the cluster gear $C_2$ and second speed gear S to lose contact and then recontact with an impact emitting the troublesome gear rattle sound. Variations in input shaft angular velocity are caused by engine firing impulses and these impulses are greatest at low speeds and smooth out at higher engine speeds.

In normal high gear or direct drive operation the input shaft 10 is drivingly locked to the output shaft 12 through the clutch mechanism sleeve 14 and the clutch mechanism 16 which is connected by splines 28 to the output shaft 12. The second speed gear S at this time is rotating on shaft 12 at a lower speed than the output shaft 12 because it is geared through the cluster gears $C_2$, C to the drive pinion P. The second speed gear S is free to rotate on surface 20 of the output shaft 12. When either torque or friction loading is applied between the constantly meshed teeth of the gears C and $C_2$ of the countershaft gear cluster 34 and the input, output gears P and S, the rattle surfaces of the several unloaded gears remain in contact and the transmission does not produce gear rattle noise.

This invention presents a preferred method of applying a friction loading to the meshed, torque free, gear teeth P, C and $C_2$, S that eliminates rattle without disturbing the shift characteristics of the transmission. In this invention the countershaft gear cluster 34 is rotatably mounted on a resiliently supported shaft 36 that is continuously urged towards the coaxially arranged input and output shafts 10, 12. When torque is being transmited through the constantly meshed teeth of the countershaft gear cluster unit 34 there is no problem of gear rattle. However, when direct drive is being transmitted through the clutch connected input and output shafts 10, 12 and the countershaft gears C, $C_2$ are unloaded, then these gears can be the source of gear noise as they may make and break contact with gears P and S respectively. It should be pointed out that with manually shifted power transmission units the input shaft 10 is usually connected to the crankshaft of the vehicle engine by a friction clutch so there is no fluid torque converter or fluid coupling to absorb the engine generated pulsations or vibrations that act to develop gear rattle in unloaded, constantly meshed, transmission gears such as the gears C, $C_2$ and S of the disclosed transmission.

FIG. 1 shows a multi-speed, sliding gear, countershaft type power transmission unit comprising a box-like housing 8 that rotatably journals a pair of axially aligned input and output shafts 10 and 12 respectively. Input shaft 10, that is adapted to be drivingly connected to an engine crankshaft (not shown), is journaled in the housing 8 by means of a ball bearing assembly 30. Input shaft 10 has integrally formed on its rear end portion the drive pinion P that is meshingly engaged with the cluster input gear C of the countershaft gear cluster assembly 34. The countershaft gear cluster assembly 34 includes in addition to the cluster input gear C, the cluster second speed gear $C_2$, the cluster first speed gear $C_1$ and the reverse drive gear $C_r$. The cluster gear assembly 34 is journaled on the housing supported countershaft 36 by means of the spaced roller bearing assemblies 37, 38. The support of the shaft 36 in the housing 8 involves this invention that will be described in detail hereafter.

The transmission output shaft 12 has its reduced diameter forward end portion 41 piloted in the rear end of the input shaft 10 by means of a roller bearing assembly 42. The rear end portion 43 of the output shaft 12 is journaled in housing 8 by means of a roller bearing assembly 44. The rear portion 45 of the output shaft 12 is helically splined to seat, by an axially slidable, drive transmitting, toothed connection 48, the first speed and reverse shifter gear F. Forward shift of gear F to engage cluster first speed gear $C_1$ will provide means for the transmission of a low or first speed forward drive from drive pinion P to cluster input gear C, to cluster first speed gear $C_1$ to shifter gear F, to output shaft 12. Likewise, rearward movement of the shifter gear F into engagement with the idler gear 46, that meshes with cluster reverse gear $C_r$, will transmit a reverse drive to the output shaft 12. As the shifter gear F is not engaged with the gears $C_1$ or $C_r$, except when drive is being transmitted therethrough, there is no problem of gear rattle noise from these gears due to make-and-break gear tooth contact such as is the case when direct or third speed forward drive is being transmitted and the cluster input gear C is driven by pinion P and the second speed gears $C_2$, S are rotatively engaged but not torque loaded.

The rear end portion of the input shaft pinion gear P is provided with a splined portion 51 that is adapted to be drivingly connected to the output shaft clutch sleeve 14 to provide for the transmission of a direct or third speed forward drive from the input shaft 10 to the output shaft 12. Clutch sleeve 14 is spline connected at 52 to the clutch mechanism 16. Clutch mechanism 16 is drivingly connected to the output shaft 12 by internal teeth 54 that are engaged in the splines 28 that are formed on the forward portion of the output shaft 12.

Rearwardly of and adjacent the clutch mechanism 16 is the second speed forward drive gear S. This gear S is rotatably mounted on the surface portion 20 of the output shaft so that it is free to rotate relative to the output shaft 12. This second speed gear S has a toothed forward portion 61 that is adapted to be drivingly connected to the clutch sleeve 14 when the sleeve 14 is shifted rearwardly. Under such a condition the second speed gear S is then connected to the output shaft 12 for the transmission of a second speed forward drive from the pinion P to the cluster gear C, to the cluster second speed gear $C_2$, to the second speed gear S, through the clutch sleeve 14 and the clutch mechanism 16, to the output shaft 12.

With the arrangement shown, when the transmission is conditioned for direct or third speed forward drive, drive torque is transmitted from the drive pinion teeth 51 through the clutch sleeve 14 to the clutch mechanism 16 on the output shaft 12 that is then directly driven by the input shaft 10. Under such circumstances the teeth of the cluster gears C and $C_2$ will not be torque loaded, and, if it were not for the invention to be hereinafter described, these gear teeth could oscillate relative to the teeth of the pinion P and second speed gear S and gear rattle noise would develop.

It might also be questioned as to whether gear rattle noise might develop when either first speed forward drive or reverse drive is transmitted because at such times the gears $C_2$ and S are not torque loaded. However, no real gear noise problem seems to develop during first speed or reverse drive because at such times the engine speed is relatively high so that cylinder firing pulsations are less likely to produce impact noise. Furthermore, first speed and reverse drive are normally used for such short periods of time that nothing of a gear rattle noise problem has been found to exist in transmissions of the disclosed type. It appears that you pass through the first speed or reverse drive ratio so fast and at such relatively high engine speeds as compared to direct drive engine speeds that there is no problem of gear rattle noise in either of these ratios.

With the construction shown, and to be described, there is a means provided to friction load the teeth of the countershaft gearing, when the transmission is conditioned for third speed forward or direct drive, so that the countershaft gears $C_2$ and C, that are not under torque load during direct drive, will not produce gear rattle. This friction loading of the countershaft gearing teeth involves the floating resilient support of the countershaft 36 in the casing 8.

From FIGS. 1-4 it will be noted that the left end of the countershaft 36 is seated in an oversized aperture 71 (see FIG. 3) in the casing 8. The right end of the shaft 36 is seated in an aperture 72 in the casing 8 which aperture may be slightly tapered to permit a slight amount of rock of the shaft 36 about its right end in a vertical plane. A key 73 anchors the shaft right end in the bore 72. The left end floating support of the shaft 36 is the crux of this invention and it will now be described in detail.

The casing 8 is formed with a bore 74 that receives a compression spring 75. A threaded plug 76 closes the lower end of bore 74 and has a stem portion 77 that bears against and seats the lower end of spring 75. It is thought to be obvious that the load of the spring 75 on the lower side of the countershaft 36 can be adjusted or varied by rotating the threaded plug 76. Stem 77 may be a separate rod section.

The left end of the shaft 36 has a flat portion 78 formed on its top side so as to seat a shim block 81. The shim block 81 is received in a rectangular slot 82 formed in the casing 8. It is thought to be clear that the shim block 81 will prevent rotation of the shaft 36 and that it will also limit upward movement of the shaft 36. In this manner the degree of resiliently applied friction loading, that is to act on the constantly meshed teeth of gears P, C and $C_2$, S, due to the compression spring 75, can be controlled. During assembly of the transmission the desired size of shim block 81 is selected to give the desired friction loading on the constantly meshed gear teeth of that particular transmission. A pressed-in plug 84 of the Welch-type covers the outside of the casing shaft bore 71 and retains the shim block 81 in place.

With the arrangement shown in FIGS. 1-4, it is thought to be obvious that normally the compression spring 75 urges the countershaft 36 upwardly (see FIG. 3) so as to press the meshed teeth of the gears P, C and $C_2$, S into close continuous engagement to prevent any make-and-break tooth contacts due to engine firing pulsations being transmitted to the gearing. This spring or resilient loading of the constantly meshed gear teeth, when the teeth are not carrying a torque load, is limited by the shim block 81 so that noise is eliminated without development of wear or heavy friction losses in the gear train. When a torque load is transmitted from the pinion gear P to the countershaft gear cluster 34 then the gear separating forces of the loaded, constantly meshed, gear teeth of gears P, C and $C_2$, S cause the shaft 36 to be urged downwardly or away from shafts 10, 12 to the position shown in FIG. 4. At this time the shaft seats in the lower half of the shaft bore 71 and the degree of shaft separation is limited so that the gearing teeth will be in their most efficient torque transmitting positions. From the foregoing description it is clear that this noise eliminating means is simple in construction, automatic in operation, and readily incorporated in any countershaft gear box without interference with the normal operation or shift characteristics of the transmission.

Figure 5:
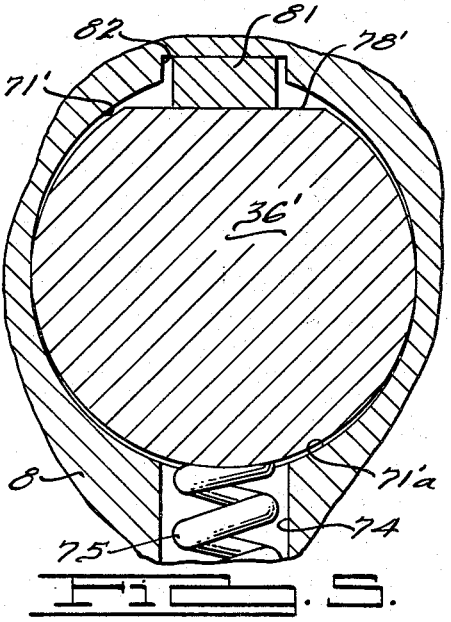
FIG. 5 is a fragmentary sectional elevational view similar to FIG. 3 but showing a modified arrangement thereof.

FIG. 5 shows a modified form of the invention shown in FIGS. 1-4. In FIGS. 1-4 the shaft receiving aperture 71 is a round hole while the shaft 36 has its left end ground down to an out-of-round, undersized, form so that it may move vertically in the round casing bore 71. In FIG. 5 the same result is achieved by making the casing bore 71' out-of-round while the shaft 36' is round except for the flat 78' that seats the shim block 81. The elongation of the casing bore 71' permits the upward vertical movement of the shaft 36' by the spring 75 that floatingly supports the shaft 36' when its gearing is not torque loaded. Shaft 36' can move downwardly to seat on the lower side 71'a of the casing bore when the countershaft gears C, $C_2$ are torque loaded.

Figure 6:
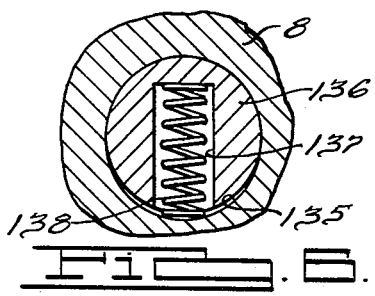
FIG. 6 is a fragmentary sectional elevational view of another modified form of countershaft resilient support.

FIG. 6 shows another modified form of the invention wherein the casing 8 has a countershaft receiving bore 135 to receive the end of the shaft 136. In this instance either the shaft or the casing bore can be out of round so as to permit limited relative vertical movement between the shaft 136 and the casing bore 135. A counterbore 137 is formed in the end of shaft 136 to receive the compression spring 138. Spring 138 reacts against the bottom of the casing bore 135 to normally urge the shaft 136 and the supported countershaft gear cluster 34 (not shown) upwardly. The FIG. 6 form of the invention functions in the same manner as the previously described FIGS. 1–5 forms of the invention. A shim block such as 81 could also be used with this form of the invention if such was desired.

Figure 7:
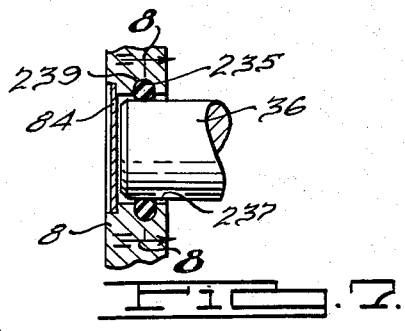
FIG. 7 is a fragmentary sectional elevational view of still another modified form of countershaft resilient support.
Figure 8:
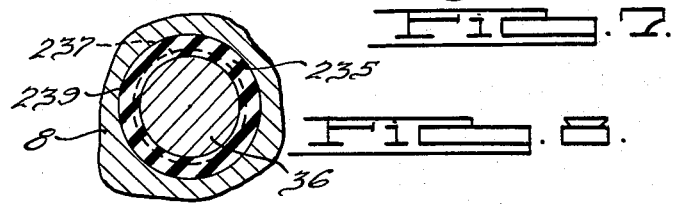
FIG. 8 is a sectional elevational view taken along the line 8—8 of FIG. 7.

FIGS. 7 and 8 show another form of this invention wherein a resilient rubber or plastic O-ring 235 supports the shaft 36 in the bore 237 in the casing 8. The shaft 36 and casing bore 237 are preferably both circular although one or the other, or both, could be out-of-round. The seal ring 235 is seated in a substantially semi-circular groove 239 in the casing 8 so that it is fixed in position with a portion of the ring extending radially inwardly beyond the groove 239. A cover plug 84 closes the outside opening to the casing bore 237.

With the shaft 36 supported as shown in FIGS. 7 and 8, the O-ring 235 resiliently urges the teeth of the countershaft gear cluster 34 (not shown) into frictional continuous engagement with the gears P and S when there is no torque loading on the countershaft gears. When the countershaft gearing is torque loaded then the gear separating forces urge the countershaft 36 downwardly to compress the underside of the O-ring 235 and support the shaft 36 on the lower side of the casing bore 237. The FIGS. 7 and 8 form functions to damp gear rattle in the same manner as the previously described forms of this invention. In addition, the FIG. 7 form has the shaft 36 supported, preferably at both ends, by resilient sound insulating, lubricant sealing rings 235 that seal and sound insulate, as well as floatingly support, the shaft 36.

Figure 9:
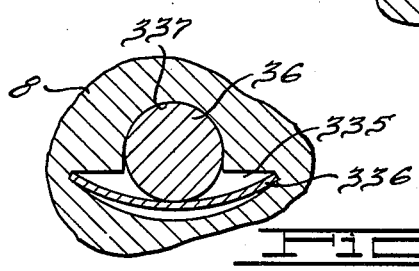
FIG. 9 is a sectional elevational view of still another modified form of countershaft resilient support.

FIG. 9 shows still another form of this invention wherein a bar or leaf type spring strip 336 normally urges one or both ends of the countershaft 36 upwardly into mating engagement with the substantially semi-circular bore grooves 337 in the casing 8. Beneath the bore groove 337 is an enlarged spring strip receiving opening 335 that is shaped to permit a limited depression of the shaft 36 and spring 336 when the countershaft gearing cluster 34 (not shown) is torque loaded. The similarity in operation of FIG. 9 form with the other spring supported shaft embodiments of this invention is thought to be obvious and not to require further detailed description.

It will be noted from an examination of FIG. 1 that the shift of the clutch sleeve 14 forwardly and rearwardly to alternately select third speed and second speed forward drive, respectively, actuates a synchronizer link 63 that is connected to the gear carried synchronizer rings 67 and 68. This type of synchronizer assembly is well known in the transmission field and as it is not a part of the invention herein claimed, it is not thought that a detailed description thereof is necessary. However, it should be pointed out that the synchronizers 67, 68 operate to assist in making clutched engagement between the clutch gear sleeve 14 and the gear carried clutch portions 51 and 61 of the pinion P and second speed gear S respectively. As the resilient support of the countershaft 36 does not vary the spacing or speed of the gears P and S it is thought to be obvious that the disclosed noise eliminating means does not affect the operation of the synchronizing means 67, 68.

We claim:

1. In a transmission, a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means resiliently supporting said countershaft gear cluster for movement towards and away from said input shaft.

2. In a transmission, a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported adjacent said input and output shafts having a first gear meshingly engaged with said input shaft drive pinion and a second gear meshingly engaged with said output shaft mounted other gear, and means to floatingly support said countershaft gear cluster for limited transverse movement between said meshed gears when torque is being transmitted therebetween.

3. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement.

4. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load.

5. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said countershaft gear cluster transmits torque load.

6. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said countershaft gear cluster transmits torque load, said resilient means comprising a coil spring.

7. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said countershaft gear cluster transmits torque load, said resilient means comprising a leaf spring.

8. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said countershaft gear cluster transmits torque load, said resilient means comprising an O-ring seal.

9. In a transmission, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said countershaft gear cluster transmits torque load, said resilient means comprising a coil spring mounted in a recess in said casing and engaged with said countershaft gear cluster.

10. In a transmissin, a casing mounting a rotatable input shaft with a drive pinion and clutch means thereon, a rotatable output shaft with an axially shiftable clutch mechanism drivingly connected thereto and another gear mounted on the output shaft adjacent said clutch mechanism and rotatable relative to said output shaft with said other gear having clutch means thereon, axial shift of said clutch mechanism being effective to selectively clutch said input shaft and said other gear to said output shaft, a unitary countershaft gear cluster rotatably supported by said casing adjacent said input and output shafts having a first gear meshingly engaged with said input shaft drive pinion and a second gear meshingly engaged with said output shaft mounted other gear, and means resiliently supporting said countershaft gear cluster and urging said meshed gears into engagement when said countershaft gear cluster is free of a torque load with said resilient countershaft supporting means being deflectible to permit limited separation of the meshingly engaged gears when said conutershaft gear cluster transmits torque load, said resilient means comprising a coil spring mounted in a recess in said countershaft gear cluster and engaged with said casing.

11. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, and means resiliently supporting one end of said countershaft on said casing and urging said countershaft towards said input and output shafts to frictionally engage the teeth of said meshed gears when they are free of torque loading.

12. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary conutershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, and means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said countershaft.

13. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said conutershaft, and a stop means to limit to degree to which the resilient means can urge the meshed gear teeth into frictional engagement.

14. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, and means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said countershaft and being seated in a bore in said casing.

15. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, and means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said countershaft and being seated in a bore in said countershaft.

16. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, and means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said countershaft and comprising a resilient O-ring seal supporting and sealingly mounting said countershaft one end in said casing bore.

17. In a countershaft-type transmission gear box, a casing supporting a rotatable input shaft mounting a drive pinion and a clutch means, a rotatable output shaft coaxial with said input shaft having a clutch mechanism axially shiftable thereon and adapted to be engaged with the input shaft clutch means to drivingly connect said shafts for direct drive, a gear rotatably mounted on said output shaft adjacent said clutch mechanism having a clutch means adapted to be drivingly engaged with said output shaft mounted clutch mechanism, a unitary countershaft gear cluster rotatably journaled on a countershaft mounted in said casing and extending parallel to said input and output shafts, said countershaft gear cluster having a first gear in meshed engagement with said input shaft drive pinion and a second gear in meshed engagement with said gear on said output shaft, means resiliently supporting one end of said countershaft on said casing and urging said countershaft towards said input and output shafts to frictionally engage the teeth of said meshed gears when they are free of torque loading, said resilient countershaft supporting means comprising an oversize bore in said casing receiving said one end of said countershaft for movement thereof towards and away from said input and output shafts with a resilient means extending between said casing and said countershaft, and a stop means to limit to degree to which the resilient means can urge the meshed gear teeth into frictional engagement comprising a removable shim engageable with said one end of said countershaft to limit movement thereof in one direction in said oversize casing bore.

18. In a transmission, a casing journaling a rotatable input shaft having a drive pinion thereon, a rotatable output shaft with an axially shiftable clutch mechanism drivingly connected thereto, another gear mounted on the output shaft adjacent said clutch mechanism and rotatable relative to said output shaft, axial shift of said clutch mechanism being effective to selectively clutch said input shaft and said other gear to said output shaft, a countershaft mounted in said casing having a gear cluster rotatably supported thereon adjacent said input and output shafts, said cluster including a first gear continuously engaged with said input shaft drive pinion and a second gear continuously engaged with said output shaft mounted other gear, and resilient means floatingly supporting at least one of said shafts so as to urge the countershaft and one of the other shafts towards one another when the countershaft gearing is free of torque load while permitting lateral separation of said shafts during torque loading of the countershaft gear cluster.

References Cited in the file of this patent

UNITED STATES PATENTS

| | | |
|---|---|---|
| 1,451,266 | Ljungstrom et al. | Apr. 10, 1923 |
| 1,847,611 | Hodkinson | Mar. 1, 1932 |